Figure 1:
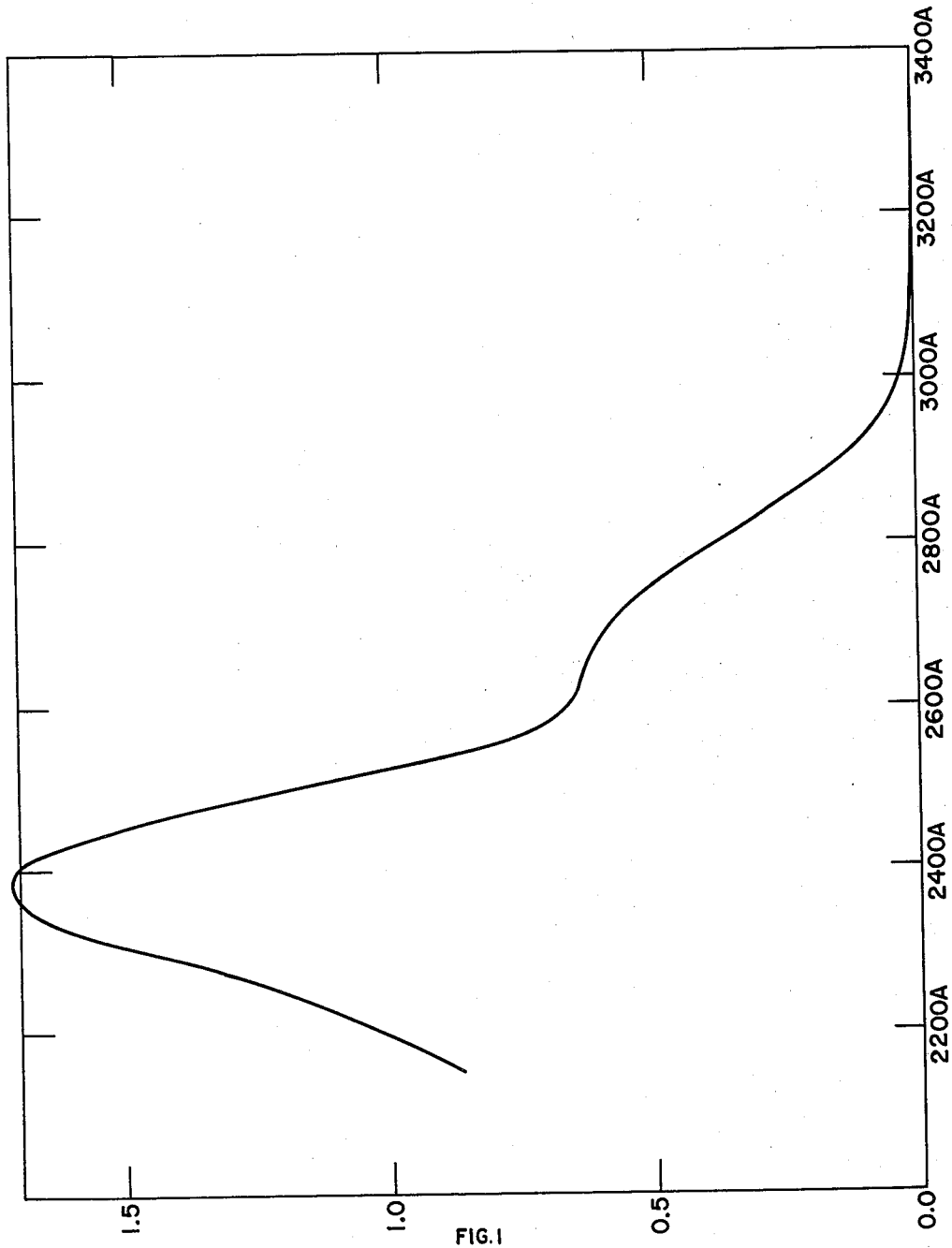

June 26, 1962  C. R. SCHOLFIELD ETAL  3,041,360
LINOLENATE-DERIVED CYCLIC MONOMER FRACTION
Filed Sept. 25, 1959  2 Sheets-Sheet 1

INVENTORS
CHARLES R. SCHOLFIELD
JOHN C. COWAN
JOHN P. FRIEDRICH

June 26, 1962 C. R. SCHOLFIELD ETAL 3,041,360
LINOLENATE-DERIVED CYCLIC MONOMER FRACTION
Filed Sept. 25, 1959 2 Sheets-Sheet 2

INVENTORS
CHARLES R. SCHOLFIELD
JOHN C. COWAN
JOHN P. FRIEDRICH

United States Patent Office 3,041,360
Patented June 26, 1962

3,041,360
LINOLENATE-DERIVED CYCLIC MONOMER FRACTION
Charles R. Scholfield and John C. Cowan, Peoria, and John P. Friedrich, Green Valley, Ill., assignors to the United States of America as represented by the Secretary of Agriculture
Filed Sept. 25, 1959, Ser. No. 842,544
12 Claims. (Cl. 260—405.6)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention pertains to a mixture of novel apparently isomeric cyclic compounds formed during a prolonged alkali isomeriation of linolenic acid with alkaline ethylene glycol.

The hydrogenated cyclic monomer mixture comprising our invention flows freely even at −70° C. and has marked commercial utility as a component of low-temperature lubricants. The alkali metal soaps are highly water-soluble and are excellent surface-tension depressants.

Although linoleic acid has been subjected to alkali isomerization with the formation of rather stable conjugated dienoic acids, we have now discovered that extended heating of methyl linolenate at 200–250° C. with an excess of potassium hydroxide in ethylene glycol forms a mixture of products comprising three major fractions, e.g., about 4.5 percent of urea-adduct-forming material, probably comprising a number of conjugated diene structures; about 13.7 percent of nonurea-adduct-forming, polymeric (dimeric), nondistillable material; and about 81.8 percent of nonurea-adduct-forming monomeric, distillable material. While the above yields have been obtained by heating equal amounts of methyl linolenate and the alkali for 7 hours, as shown in Example 2, we found that as little as a 5 percent excess of alkali over that required for saponification gives effective yields with linolenic acid (using linseed oil) if heating at 220° C. is extended to about 14 hours. Other adjustments of time, temperature, and concentration relationships will be apparent to one skilled in the art.

For convenience we will hereinafter designate the urea-adduct-forming material as AF, the nonurea-adduct-forming polymeric material as NAP, and the nonurea-adduct-forming monomeric material as NAM.

The present invention is concerned only with the NAM fraction which comprises a mixture of isomeric cyclic monomers. This invention is also directed to the hydrogenated forms of these isomers as well as to their alkyl esters and to compositions containing the same. The NAM fraction of this invention may be obtained substantially free of the AF and NAP fractions by appropriate fractional cooling with or without prior separation of the diazomethane-esterified AF fraction by the urea complex separation procedure of Parker et al., J. Am. Oil Chemists Soc., 34, 43 (1957). Alternatively, following separation of the AF by urea adduct formation and filtration from methanol followed by an ether wash, the filtrate and ether wash are pooled and treated with water containing a small amount of HCl, the combined esters recovered by ether extraction, the ether then washed with water, dried over sodium sulfate, and removed in vacuo to give a mixture of NAM esters and NAP esters which are separated by vacuum distillation of the NAM component and recovery of the NAP residues. The NAM component boils at 154–161° C. at less than 0.1 mm. Hg pressure, and its molecular weight as determined by cryoscopy in benzene is 296. The molecular weight of the NAP is 570.

Figure 2:
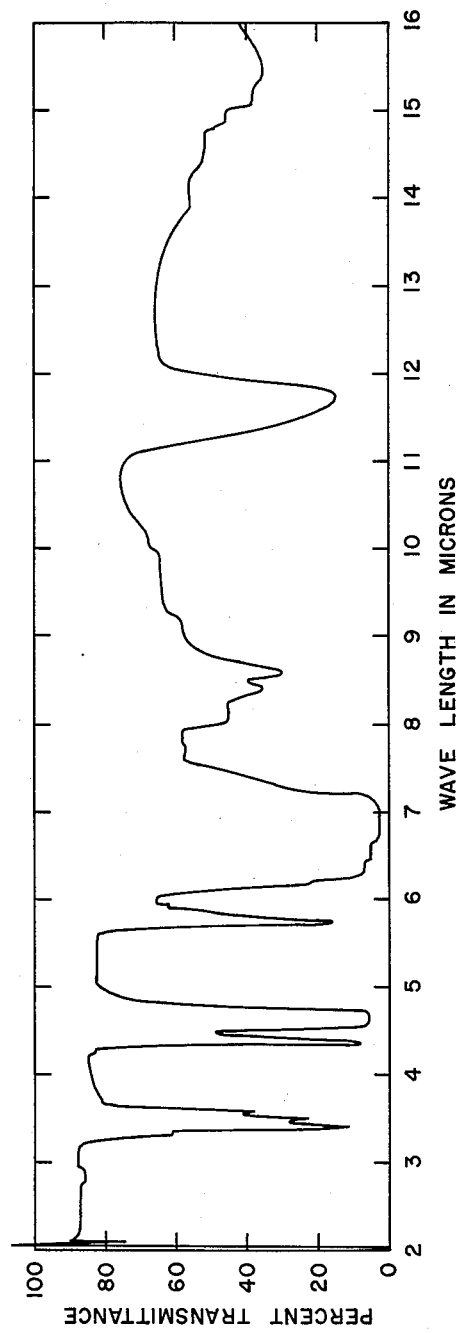

To facilitate a clearer description of NAM, reference is made to the accompanying drawings in which FIGURE 1 represents the ultraviolet absorption spectrum of NAM and FIGURE 2 represents the infrared absorption spectrum of NAM.

As shown in FIGURE 1, absorption maximum at 238 m$\mu$ is indicative of diene conjugated unsaturation but the maximum is at a higher wave length than the 232–234 m$\mu$ usually found with straight chain fatty acids. The absorption at 260–265 m$\mu$ without the more complex structure found with triene conjugation suggests the presence of a conjugated cyclic hexadiene structure.

As shown in FIGURE 2, the infrared absorption bands in the 10$\mu$ region, ordinarily found with conjugated trans,-trans or cis,trans configurations are absent, thus providing additional evidence for the presence of a ring structure. The band at 13.3$\mu$ which is probably caused by an aromatic structure and which is reported by most other workers for cyclic acids from fatty acids is also absent.

Unsaturation of the esters was measured by determining the hydrogen uptake in ethyl acetate solution using a platinum oxide catalyst. Results calculated as iodine values were 128 for the NAM, 57 for the NAP, and 220 for the AF.

A cyclic monomeric or branched nature of the NAM fraction was suggested by the failure of the hydrogenated form to form an adduct with urea, and the cyclic rather than the branched alternative was established by treatment with N-bromosuccinimide followed by dehydrobromination with dimethylaniline and oxidation of the resulting product to phthalic anhydride with permanganate. This also shows that at least a large part of the NAM must contain a 6-carbon ring.

The complex nature of our novel NAM fraction was also shown by countercurrent distribution between pentane-hexane and 2 N AgNO$_3$ in 90 percent methanol, thus separating about 20 percent of the monomer as a fraction with a partition coefficient of 2.2 and having a maximum absorbtivity at 264 m$\mu$ of 18.6. The remainder of the monomer was found in a single peak with a partition coefficient of 7.3. The NAM was also fractionated by gas chromatography using "Resoflex 296" on "Celite" at 204° C. The eluent gas was collected in methanol in eight fractions and the UV absorption measured. At least seven incompletely separated compounds appeared to be present. Infrared absorption bands in the 10$\mu$ region ordinarily found with trans,trans or cis,trans configurations were absent, thus providing additional evidence for the presence of a ring structure.

The following examples are presented to more clearly show the operation of our invention.

EXAMPLE 1

A mixture of 60 g. of pure methyl linolenate, 60 g. of potassium hydroxide, and 250 ml. of ethylene glycol was heated for 7 hours at 200° C. under nitrogen. After cooling to 100° C., 250 ml. of water was added, and the mixture was refluxed for 5 min. The reaction mixture was cooled and acidified with dilute H$_2$SO$_4$. The acids were dissolved in ethyl ether, washed free of H$_2$SO$_4$ with water, and dried over sodium sulfate. Sufficient diazomethane was added to give a persistent yellow color and form the methyl esters. After evaporation of the solvent ether the yield was 55.8 g. (93%). A solution of 90 g. urea in 300 ml. of MeOH was added to the isomerized esters and the mixture warmed to reflux and then allowed to cool to room temperature. The urea adduct was removed by filtration on a Buchner funnel and washed with ether, yield, 2.40 g. The filtrate and wash were combined and treated with water containing a small amount of HCl, and the esters were recovered by extraction with ethyl ether. The ether solutions were freed of acid by washing with water and then dried over $Na_2SO_4$. The ether was removed under vacuum. The weights of material were: urea adduct, 2.40 g.; filtrate and wash residue, 50.70 g. The nonadduct-forming material recovered from the urea treatment was distilled under vacuum through a Vigreaux column, B.P. 154–161° C. at less than 0.1 mm. Hg pressure. Yield of distillate (NAM) from 50 g. was 40.63 g. (80.3%), and yield of residue (NAP) was 6.85 g. (13.9%).

Table I

| Physical Properties of Hydrogenated deriv. | Refractive index at 25° C. | Specific gravity at 25° C. | Iodine value | Boiling point, 0.075 mm. Hg | Freezing point to −70° C. | Neutralization equiv. |
| --- | --- | --- | --- | --- | --- | --- |
| Cyclic acids | 1.4698 | 0.936 | <1 | 159–166 | No crystallization. | 286 |
| Methyl esters of the above acids | 1.4609 | 0.918 | <1 | 125–131 | ___do___ | |

EXAMPLE 2

100 g. of linseed oil was added to a solution of 22.8 g. of 87.2 percent potassium hydroxide in 300 ml. of diethylene glycol at 150° C. (this represents a 5 percent excess of alkali over that required for saponification). The reaction temperature was increased to 220° C. and maintained for 14 hours. The reaction was conducted under nitrogen. The mixture was then cooled, acidified, and the products isolated in conventional manner. The crude methyl esters were formed by refluxing with methyl alcohol in the presence of an acid catalyst. Distillation of the crude esters yielded 72.5 g. of water-white material, B. 121–155° C. at about 0.1 mm. Hg and 17.5 g. of a viscous pot residue. Hydrogenation of 25 g. of the above mentioned water-white cyclic ester material was conducted in a rocker-type high pressure 300 ml. glass-lined steel bomb containing 0.25 g. of 10 percent palladium on carbon as the catalyst. Hydrogen at a pressure of 2,000 p.s.i. was applied at 150° C. for 4 hours. The contents of the bomb were then dissolved in about 150 ml. of acetone and the catalyst filtered off. The acetone solution was then cooled to about 0° C. to solidify methyl stearate, which was then filtered off. The mother liquor was then cooled to −60° C. and filtered. The filtrate was stripped of acetone to yield 9.5 g. of a slightly yellowish oil which distilled to a colorless product. The physical properties of the methyl ester and corresponding acid are given in Table I.

Having thus disclosed our invention, we claim:

1. The method which comprises heating a member of the group consisting of linseed oil and methyl linolenate with an excess of potassium hydroxide in an ethylene glycol medium for at least 7 hours at a temperature of about from 200°–250° C., acidifying the reaction mixture to produce a mixture of fatty acids, esterifying the said mixture with a member of the group consisting of diazomethane and a lower alkanol, reacting the esterified mixture with urea to produce an insoluble adduct, and distilling the non-urea-adduct-forming residue at a temperature of about from 154°–161° C. to recover an unsaturated non-urea-adduct-forming monomer.

2. The method of claim 1 wherein the mixture of fatty acids is esterified with methanol to produce the corresponding methyl esters.

3. The method of claim 1 wherein the mixture of fatty acids is esterified with diazomethane to produce the corresponding methyl esters.

4. The method which comprises heating a member of the group consisting of linseed oil and methyl linolenate with an excess of potassium hydroxide in an ethylene glycol medium for at least 7 hours at a temperature of about from 200°–250° C., acidifying the reaction mixture to produce a mixture of fatty acids, esterifying the said mixture with a member of the group consisting of diazomethane and a lower alkanol, reacting the esterified mixture with urea to produce an insoluble adduct, distilling the non-urea-adduct-forming residue at a temperature of about from 154°–161° C., and hydrogenating the distillate.

5. The method of claim 4 wherein the mixture of fatty acids is esterified with methanol to produce the corresponding methyl esters.

6. The method of claim 4 wherein the mixture of fatty acids is esterified with diazomethane to produce the corresponding methyl esters.

7. The method which comprises heating a member of the group consisting of linseed oil and methyl linolenate with at elast 1.05 molar equivalents (based on the fatty acid content) of potassium hydroxide in an ethylene glycol medium for at least 7 hours at a temperature of about from 200°–250° C., acidifying the reaction mixture to produce a mixture of fatty acids, esterifying the said mixture with a member of the group consisting of diazomethane and a lower alkanol, reacting the esterified mixture with urea to produce an insoluble adduct, and distilling the non-urea-adduct-forming residue at a temperature of about from 154°–161° C. at a pressure of less than 0.1 mm. Hg to recover an unsaturated non-urea-adduct-forming monomer.

8. The method of claim 7 wherein the mixture of fatty acids is esterified with methanol to produce the corresponding methyl esters.

9. The method of claim 7 wherein the mixture of fatty acids is esterified with diazomethane to produce the corresponding methyl esters.

10. The method which comprises heating a member of the group consisting of linseed oil and methyl linolenate with at least 1.05 molar equivalents (based on the fatty acid content) of potassium hydroxide in an ethylene glycol medium for at least 7 hours at a temperature of about from 200°–250° C., acidifying the reaction mixture to produce a mixture of fatty acids, esterifying the said mixture with a member of the group consisting of diazomethane and a lower alkanol, reacting the esterified mixture with urea to produce an insoluble adduct, distilling the non-urea-adduct-forming residue at a temperature of about from 154°–161° C. at a pressure of less than 0.1 mm. Hg, and hydrogenating the distillate.

11. The method of claim 10 wherein the mixture of fatty acids is esterified with methanol to produce the corresponding methyl esters.

12. The method of claim 10 wherein the mixture of fatty acids is esterified with diazomethane to produce the corresponding methyl esters.

References Cited in the file of this patent

UNITED STATES PATENTS

| 2,350,583 | Bradley | June 6, 1944 |
| 2,358,623 | Burr | Sept. 19, 1944 |
| 2,481,356 | Seggessemann | Sept. 6, 1949 |

FOREIGN PATENTS

| 461,102 | Canada | Nov. 15, 1949 |